United States Patent
Yang et al.

(10) Patent No.: US 11,922,939 B2
(45) Date of Patent: Mar. 5, 2024

(54) WAKE SUPPRESSION FOR AUDIO PLAYING AND LISTENING DEVICES

(71) Applicant: SoundHound, Inc., Santa Clara, CA (US)

(72) Inventors: Hsuan Yang, San Jose, CA (US); Qindí Zhāng, Los Altos, CA (US); Warren S. Heit, Los Altos Hills, CA (US)

(73) Assignee: SoundHound AI IP, LLC, Santa Clara, CA (US)

( * ) Notice: Subject to any disclaimer, the term of this patent is extended or adjusted under 35 U.S.C. 154(b) by 0 days.

(21) Appl. No.: 17/736,850

(22) Filed: May 4, 2022

(65) Prior Publication Data

US 2022/0262362 A1    Aug. 18, 2022

Related U.S. Application Data

(63) Continuation of application No. 16/781,214, filed on Feb. 4, 2020, now Pat. No. 11,328,721.

(51) Int. Cl.
*G10L 15/22*    (2006.01)
*G10L 15/08*    (2006.01)
*G10L 15/30*    (2013.01)

(52) U.S. Cl.
CPC .............. *G10L 15/22* (2013.01); *G10L 15/08* (2013.01); *G10L 15/30* (2013.01); *G10L 2015/088* (2013.01); *G10L 2015/223* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 8,761,406 | B2* | 6/2014 | Ohkuri | H03G 3/32 |
| | | | | 381/98 |
| 9,484,030 | B1* | 11/2016 | Meaney | H04R 3/005 |
| 9,728,188 | B1* | 8/2017 | Rosen | G10L 25/51 |
| 10,127,908 | B1* | 11/2018 | Deller | H04L 67/02 |
| 10,186,265 | B1* | 1/2019 | Lockhart | G10L 15/32 |
| 10,192,553 | B1* | 1/2019 | Chenier | H04L 65/80 |
| 10,338,880 | B2* | 7/2019 | Burton | G06Q 30/0251 |
| 10,339,925 | B1 | 7/2019 | Rastrow et al. | |
| 10,339,957 | B1* | 7/2019 | Chenier | H04L 67/306 |

(Continued)

OTHER PUBLICATIONS

Sayaka Shiota, et al., Voice liveness detection algorithms based on pop noise caused by human breath for automatic speaker verification. InSixteenth annual conference of the international speech communication association, Sep. 6-10, 2015 (pp. 239-243).

(Continued)

*Primary Examiner* — Marcus T Riley
(74) *Attorney, Agent, or Firm* — Vierra Magen Marcus LLP

(57) ABSTRACT

A system and method are disclosed for ignoring a wakeword received at a speech-enabled listening device when it is determined the wakeword is reproduced audio from an audio-playing device. Determination can be by detecting audio distortions, by an ignore flag sent locally between an audio-playing device and speech-enabled device, by and ignore flag sent from a server, by comparison of received audio played audio to a wakeword within an audio-playing device or a speech-enabled device, and other means.

10 Claims, 13 Drawing Sheets

(56) References Cited

U.S. PATENT DOCUMENTS

| | | | |
|---|---|---|---|
| 10,425,780 B1 | 9/2019 | Devaraj et al. | |
| 10,425,781 B1 | 9/2019 | Devaraj et al. | |
| 10,448,115 B1* | 10/2019 | Jamal | G10L 15/1815 |
| 10,468,027 B1* | 11/2019 | Deller | G06F 3/167 |
| 10,490,195 B1* | 11/2019 | Krishnamoorthy | G10L 17/22 |
| 10,560,974 B2* | 2/2020 | Song | H04W 4/20 |
| 10,580,405 B1* | 3/2020 | Wang | G10L 15/30 |
| 10,593,328 B1* | 3/2020 | Wang | H04L 65/1059 |
| 10,616,726 B1 | 4/2020 | Freeman, II et al. | |
| 10,685,669 B1 | 6/2020 | Lan et al. | |
| 10,733,987 B1* | 8/2020 | Govender | G10L 17/06 |
| 10,878,812 B1* | 12/2020 | Helwani | G10L 25/84 |
| 10,887,764 B1* | 1/2021 | Mokady | H04W 4/14 |
| 10,896,679 B1 | 1/2021 | Hu et al. | |
| 11,043,205 B1* | 6/2021 | Su | G10L 15/183 |
| 11,081,104 B1* | 8/2021 | Su | G06F 40/216 |
| 11,133,004 B1* | 9/2021 | Naik | G10L 15/22 |
| 11,256,261 B1 | 2/2022 | Bai et al. | |
| 11,308,938 B2* | 4/2022 | Wieman | G10L 15/22 |
| 11,308,957 B2* | 4/2022 | Trapp | G10L 15/22 |
| 11,328,721 B2* | 5/2022 | Yang | G10L 15/22 |
| 11,531,789 B1* | 12/2022 | Eberhardt | G06F 30/18 |
| 11,532,310 B2* | 12/2022 | Kim | G10L 15/30 |
| 11,545,155 B2* | 1/2023 | Gomar | G10L 17/00 |
| 11,676,586 B2* | 6/2023 | Robert Jose | G06F 3/14 |
| | | | 704/251 |
| 11,694,695 B2* | 7/2023 | Lesso | G10L 17/10 |
| | | | 704/247 |
| 2007/0015485 A1* | 1/2007 | DeBiasio | H04L 67/12 |
| | | | 455/345 |
| 2008/0225941 A1* | 9/2008 | Hino | H04N 7/165 |
| | | | 375/240.01 |
| 2009/0310793 A1* | 12/2009 | Ohkuri | G10L 21/0208 |
| | | | 381/71.1 |
| 2010/0161825 A1* | 6/2010 | Ronca | H04N 21/23611 |
| | | | 380/212 |
| 2011/0050478 A1* | 3/2011 | Choi | H04N 21/42227 |
| | | | 341/176 |
| 2015/0078575 A1* | 3/2015 | Selig | H04R 1/1025 |
| | | | 381/74 |
| 2016/0029118 A1* | 1/2016 | Ueda | H04R 3/00 |
| | | | 381/119 |
| 2016/0234589 A1* | 8/2016 | Selig | H04R 1/1041 |
| 2016/0357501 A1* | 12/2016 | Burton | G06Q 30/0201 |
| 2016/0372139 A1* | 12/2016 | Cho | G10L 25/93 |
| 2017/0111738 A1* | 4/2017 | Murray | H04R 27/00 |
| 2017/0329573 A1 | 11/2017 | Mixter | |
| 2018/0054689 A1* | 2/2018 | Chen | H04S 3/008 |
| 2019/0124388 A1* | 4/2019 | Schwartz | G06F 3/167 |
| 2019/0180740 A1* | 6/2019 | Nandy | G10L 15/30 |
| 2019/0215879 A1* | 7/2019 | Song | G10L 15/22 |
| 2019/0244618 A1* | 8/2019 | Newendorp | G10L 15/32 |
| 2019/0295552 A1* | 9/2019 | Pasko | G10L 15/30 |
| 2019/0305812 A1* | 10/2019 | Kolsrud | H04B 17/318 |
| 2020/0120396 A1* | 4/2020 | Jamal | H04N 21/4825 |
| 2020/0251107 A1* | 8/2020 | Wang | G10L 15/22 |
| 2021/0090561 A1* | 3/2021 | Trapp | H04W 12/06 |
| 2021/0090578 A1* | 3/2021 | Trapp | H04L 63/102 |
| 2021/0174783 A1* | 6/2021 | Wieman | G10L 15/1815 |
| 2021/0174806 A1* | 6/2021 | Krishnaswamy | G10L 15/22 |
| 2021/0241759 A1* | 8/2021 | Yang | G10L 15/08 |
| 2021/0249004 A1 | 8/2021 | Smith | |
| 2021/0366476 A1 | 11/2021 | Smith et al. | |
| 2021/0366477 A1 | 11/2021 | Smith et al. | |
| 2022/0262362 A1* | 8/2022 | Yang | G10L 15/30 |

OTHER PUBLICATIONS

Yuan Gong, et al., Protecting voice controlled systems using sound source identification based on acoustic cues. In2018 27th International Conference on Computer Communication and Networks (ICCCN) Jul. 30, 2018 (pp. 1-9). IEEE.

Gajan Suthokumar, et al., Independent Modelling of High and Low Energy Speech Frames for Spoofing Detection. InINTERSPEECH 2017, Aug. 20-24, 2017 (pp. 2606-2610).

P. Korshunov, et al., On the use of convolutional neural networks for speech presentation attack detection. In2018 IEEE 4th International Conference on Identity, Security, and Behavior Analysis (ISBA) Jan. 11, 2018 (pp. 1-8). IEEE.

Office Action dated Oct. 14, 2021 in U.S. Appl. No. 16/781,214.

Response to Office Action dated Jan. 12, 2022 in U.S. Appl. No. 16/781,214.

Final Office Action dated Mar. 2, 2022 in U.S. Appl. No. 16/781,214.

Response to Final Office Action dated Mar. 9, 2022 in U.S. Appl. No. 16/781,214.

Notice of Allowance and Fee(s) Due dated Mar. 20, 2022 in U.S. Appl. No. 16/781,214.

* cited by examiner

WAKE SUPPRESSION FOR AUDIO PLAYING AND LISTENING DEVICES

PRIORITY CLAIM

The present application is a continuation of U.S. patent application Ser. No. 16/781,214, filed on Feb. 4, 2020, entitled "WAKE SUPPRESSION FOR AUDIO PLAYING AND LISTENING DEVICES," to be issued as U.S. Pat. No. 11,328,721, which application is incorporated by reference herein in its entirety.

FIELD technology relates to wakewords for speech-enabled devices, and in particular, to suppressing wakeup of a speech-enabled device when the wakeword is transmitted from an audio-playing device.

BACKGROUND

Automatic speech recognition (ASR) systems that recognize human speech, together with natural language understanding (NLU) capabilities that extract the meaning of the speech, offer tremendous potential as an easy and natural way to interface with speech-enabled devices. Such systems are enabled in part by the vast computational and communication resources available in modern devices. Advanced speech understanding systems such as virtual assistants have been developed, which are able to recognize a wide range of speech and process complex requests in different languages and dialects.

Virtual assistants generally do not respond to spoken requests when idle. They wake up, and switch state from idle to active, upon receiving an activation signal, such as a spoken activation word or phrase, referred to as a wakeword (or wakephrase). Various commercial implementations of wakewords for speech-enabled devices include, "Hey, Siri", "OK, Google", and "Alexa". When idle, speech-enabled devices use an audio processing algorithm called a wakeword spotter to continuously monitor the incoming audio to detect a wakeword. Upon detecting a wakeword, the wakeword spotter causes the device to wake to an active state.

One problematic area in the use of speech-enabled devices are false triggers, where the device wakes to an active state upon improperly inferring that a wakeword was spoken. For example, where an audio-playing device is playing an audio book, news, sports broadcast, etc., the audio stream from the playing device may include the wakeword for a speech-enabled listening device within audio range of the playing device. When this happens, the listening device may undesirably wake up even though the user had no intention of querying the listening device. This can be annoying, or worse still, a malicious actor could put the wakeword into a live stream of audio at specific times to trigger a listening device in order to access information from, or spy on, a user.

DETAILED DESCRIPTION

The present technology will now be described with reference to the figures, which relate to different embodiments of a system for suppressing wakeup of a speech-enabled listening device when it is determined that the audio including the wakeword is reproduced audio from an audio-playing device, as opposed to a user speaking the wakeword within audio range of the listening device. In embodiments, the playing and listening devices may be networked together, and one of the devices can analyze the audio stream to be broadcast by the playing device to detect the presence of a wakeword in advance of it being broadcast. Upon such detection, the listening device may suppress wake up, either upon receipt of a suppression signal from the playing device, or upon confirming with the playing device that it just broadcast a wakeword. In further embodiments described hereinafter, the playing and listening devices need not be networked together.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
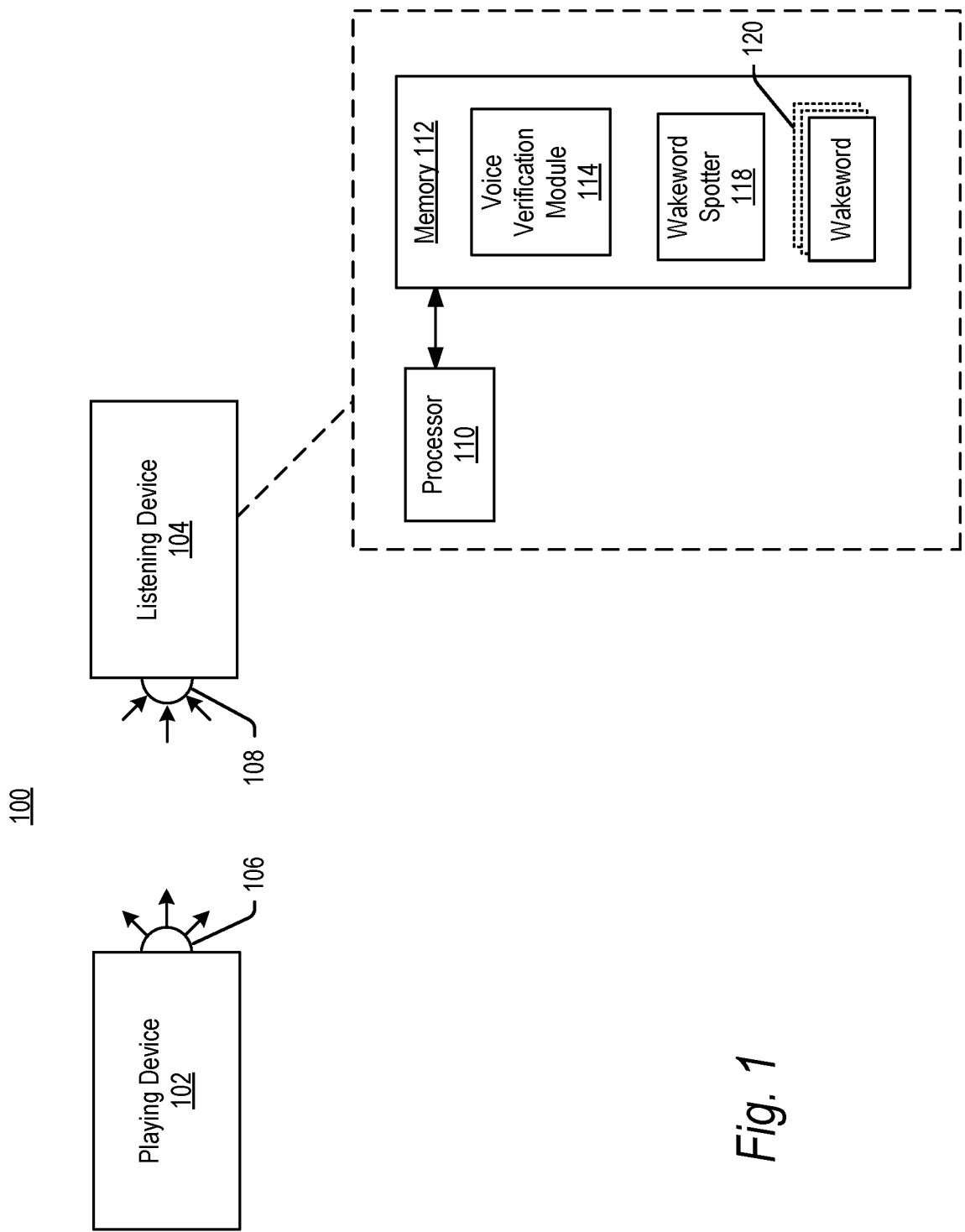
FIG. 1 is a schematic representation of a first system for wake suppression of a listening device according to embodiments of the present technology.

FIG. 1 is a schematic block diagram of a system 100 comprising a playing device 102 and listening device 104 for implementing aspects of the present technology. In this embodiment, the playing device 102 has no network connection to the listening device 104. Thus, in the embodiment of FIG. 1, the playing device 102 communicates with the listening device 104 by acoustic waves traveling through the air (or other medium) between the playing device 102 and listening device 104. This is referred to herein as the playing device broadcasting audio, or audio content.

The playing device 102 may be or include an agent having any of various software and/or hardware modules configured to output an audio signal. Such devices may include but are not limited to audio or audio/video players such as phones, computers, radios, stereos, televisions, voice recording and playback systems, intercoms, etc. The playing device 102 may include a speaker 106 for outputting the audio content. In further embodiments, the playing device may itself be a speaker, instead of including a speaker.

The listening device 104 may include a microphone 108 and may be any device capable of receiving an audio signal, processing the audio signal and waking from an idle state to an active state upon detecting a wakeword in the audio that is assigned to the device. Listening device 104 may be or include an agent having any of various software and/or hardware modules configured to accept voice requests. Such devices include but are not limited to cellular telephones, digital assistants, tablets and other computing devices, automobile control systems, stand-alone digital assistants and others.

In embodiments shown and described herein, a single playing device 102 outputs audio which is received by a single listening device 104. However, in further embodiments, multiple playing devices 102 may output audio to a single listening device 104, a single playing device 102 may output audio to multiple listening devices 104, or multiple playing devices 102 may output audio to multiple listening devices 104. In examples shown and described herein, the playing and listening devices 102, 104 are different devices. However, in further embodiments, the playing and listening devices 102, 104 may be incorporated into a single device. One example is a cellular telephone or computing device which is capable of both transmitting and receiving audio signals. In such embodiments, without the aid of the present technology, a cellular telephone for example may output audio content from a first software application which may include a wakeword that would undesirably wake a digital assistant operating by a second software application.

As noted, in the embodiment of FIG. 1, listening device 104 includes a microphone 108 capable of receiving audio from users near the listening device 104 or from the speaker 106 of playing device 102. Listening device 104 includes components for processing received audio. A more detailed explanation of these components is described below with reference to FIG. 14, but in general, the listening device 104 may include a processor 110 configured to control the operations within listening device 104, as well as facilitate communications between various components within listening device 104. The processor 110 may include a standardized processor, a specialized processor, a microprocessor, or the like that may execute instructions for controlling listening device 104.

The listening device 104 may further include a memory 112 that may store algorithms that may be executed by the processor 110. According to an example embodiment, the memory 112 may include random access memory (RAM), read only memory (ROM), cache, Flash memory, a hard disk, and/or any other suitable storage component. As shown in FIG. 1, in one embodiment, the memory 112 may be a separate component in communication with the processor 110, but the memory 112 may be integrated into the processor 110 in further embodiments.

Memory 112 may store various software application programs executed by the processor 110 for controlling the operation of the listening device 104. Such application programs may for example include a first audio processing software algorithm referred to herein as a voice verification module 114. An embodiment of the voice verification module is explained in greater detail below, but in general, it is used to discern whether audio received by the microphone 108 of listening device 104 is coming from a live person in the vicinity of the listening device 104, or from the playing device 102. Memory 112 may further include a second audio processing software algorithm in the form of a wakeword spotter 116. An embodiment of the wakeword spotter 116 is explained below, but as indicated, the wakeword spotter 116 is used for detecting a wakeword in audio received in the listening device 104. Memory 112 may store other algorithms in further embodiments. Memory 112 may also store various data records, including for example one or more wakewords 120. A wakeword may typically be a word or short phrase, but it is possible that a wakeword 120 may be other audio patterns, such as a series of claps, taps or other distinctive, repeatable sound generated by a user using other than his or her voice.

As described in the Background section, it is desirable to be able to discern when audio is coming from a playing device 102, as opposed to a live human, and suppress wakeup of the listing device 104 when it is determined a wakeword comes from the playing device 102. In the embodiment of FIG. 1, where there is no network connection between the playing and listening devices 102, 104, this is accomplished by the voice verification module 114. Various acoustic differences exist between audio received from a live person (referred to herein as live audio) and audio received from a playing device 102 (referred to herein as reproduced audio). The verification module 114 may operate according to any of a wide variety of technologies for detecting these differences between live and reproduced audio.

In one embodiment, the voice verification module 114 may detect the presence of so-called pop noise, which is a distortion in an audio waveform that happens when human breath reaches a microphone. This same distortion phenomena does not happen in reproduced audio. Methods of detecting differences between live audio and reproduced audio using pop noise are described for example in a published paper by Shioto et al., entitled, "Voice Liveness Detection Algorithms Based on Pop Noise Caused by Human Breath for Automatic Speaker Verification," *Interspeech*, 2015, which publication is incorporated by reference here in its entirety. By detecting the presence or absence of pop noise, the voice verification module 114 may discern whether audio is live audio from a live user or reproduced audio from playing device 102.

The voice verification module 114 may detect the differences between live and reproduced audio using a wide variety of other audio processing techniques in further embodiments. These other techniques may identify differences between live and reproduced audio using acoustic features such as audio spectrograms, including spectral and cepstral-based features with temporal derivatives, phase spectrum based features, the combination of amplitude and phase features, constant Q cepstral coefficients (CQCCs), extraction of local binary patterns in the cepstral domain, and audio quality based features. Additionally, the voice verification module 114 may implement a neural network, such as a convolutional neural network, which may be trained using the above mentioned and/or other acoustical data as inputs, in order to discern whether audio is live audio or reproduced audio from playing device 102. One example of such a neural network is described in a published paper by Korshunov et al., entitled, "On the Use of Convolutional Neural Networks for Speech Presentation Attack Detection," IEEE *4th International Conference on Identity, Security, and Behavior Analysis,* 2018, which publication is incorporated by reference here in its entirety.

The wakeword spotter 118 may operate according to a variety of technologies to detect the one or more stored wakewords 120 in live or reproduced audio received by microphone 108 of listening device 104. In general, the wakeword spotter 118 may implement (or work in conjunction with) an automatic speech recognition (ASR) engine. The ASR engine may generate one or more phonetic and/or textual transcriptions of an audio segment comprising a wakeword, and a score for each one, indicative of the confidence level of each transcription. The ASR engine may employ any combination of signal processing, Hidden Markov Models, Viterbi search, phonetic dictionaries, and recurrent or convolutional neural networks to generate transcriptions and their confidence scores in order to determine whether a wakeword was received. In embodiments, the listening device 104 may be activated by multiple wakewords, each of which is stored in memory 112. In such embodiments, the listening device 104 may implement multiple wakeword spotters 118, running in parallel, to detect the respective multiple wakewords.

Figure 2:
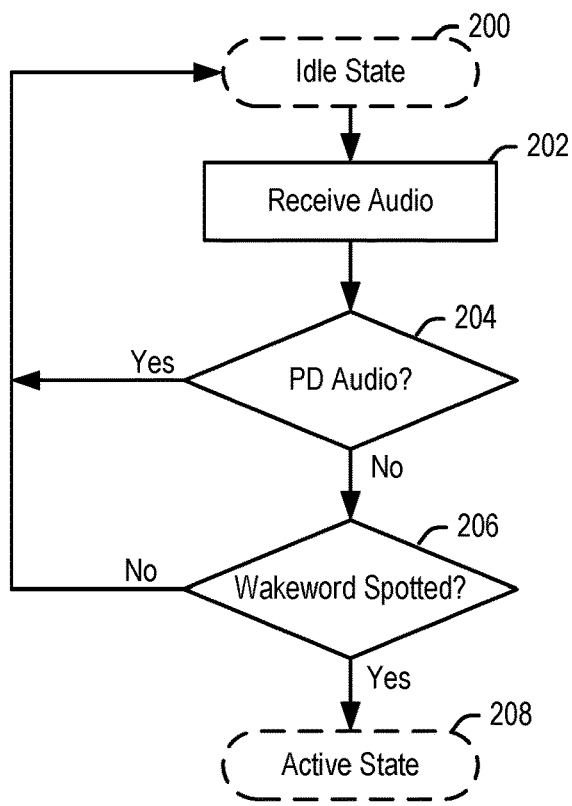
FIG. 2 is a flowchart for the operation of the first system for wake suppression of a listening device according to embodiments of the present technology.
Figure 3:
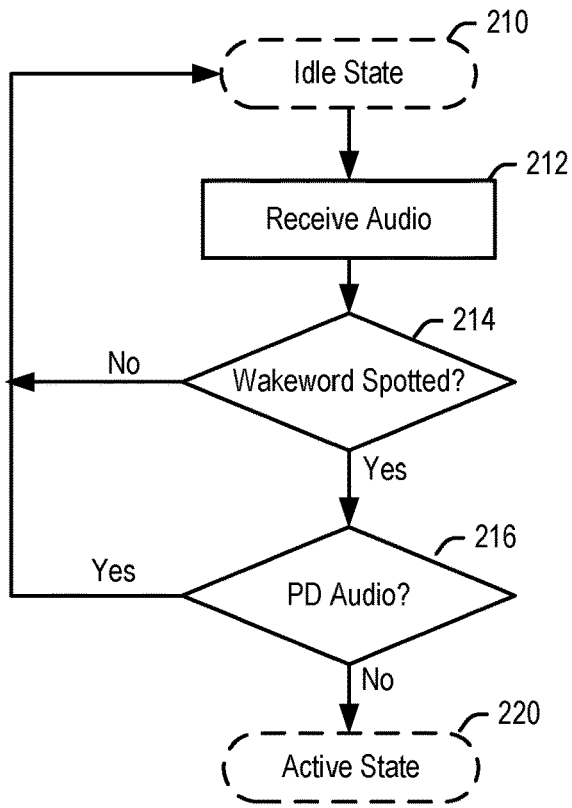
FIG. 3 is a flowchart for the operation of the first system for wake suppression of a listening device according to further embodiments of the present technology.

FIGS. 2 and 3 are flowcharts illustrating possible operational implementations of the system shown in FIG. 1. Referring initially to FIG. 2, the listening device 104 may exist in an idle state in step 200. In step 202, audio is received at microphone 108 and analyzed by the processor 110 executing voice verification module 114. If the processor 110 determines that the received audio is from the playing device 102 in step 204, the listening device 104 remains in idle state (step 200). Conversely, if the processor 110 determines that the received audio is not from a playing device 102, and is live audio, the processor 110 executes the wakeword spotter 118 to determine if the audio includes a stored wakeword in step 206. If so, listening device switches to an active state in step 208. If no wakeword is found in the received audio, the listening device remains in the idle state (step 200).

The operational embodiment described with respect to the flowchart of FIG. 2 ignores any audio that is determined to come from playing device 102. FIG. 3 illustrates an alternative operational embodiment for the system of FIG. 1. The listening device 104 exists in an idle state in step 210. In step 212, audio is received at microphone 108 and analyzed by the processor 110 executing the wakeword spotter 118 in step 214 to determine if the received audio includes a stored wakeword. If not, the listening device 104 remains in idle state (step 210). If a wakeword is found in step 214, the processor 110 uses the voice verification module 114 in step 216 to determine if the received audio is from playing device 102. If so, the listening device remains in the idle state (step 210) if not, the listening device switches to an active state in step 220. It is possible in further embodiments that a wakeword spotter and playing device audio detection occur simultaneously in parallel.

The system described with respect to FIGS. 1-3 has an advantage that the listening device 104 may ignore wakewords determined to come from the playing device 102 despite their being no network connection or other association between the playing and listening devices 102, 104. However, in further embodiments of the present technology, the playing and listening device 102, 104 may be connected to each other by a network connection. Such embodiments provide an advantage in that the playing and/or listening devices can examine the audio before it is broadcast from the playing device and suppress wakeup of the listening device for any wakewords detected in the broadcast audio. Such an embodiment is described below with respect to FIGS. 4-13. It is understood that the voice verification module 114 may be used in any of the embodiments described with respect to FIGS. 4-13 to identify live audio and reproduced audio as explained above. In the embodiments of FIGS. 4-13, the voice verification module 114 may be used in addition to or instead of the methods explained with respect to FIGS. 4-13 to identify wakewords in audio from a playing device 102.

Figure 4:
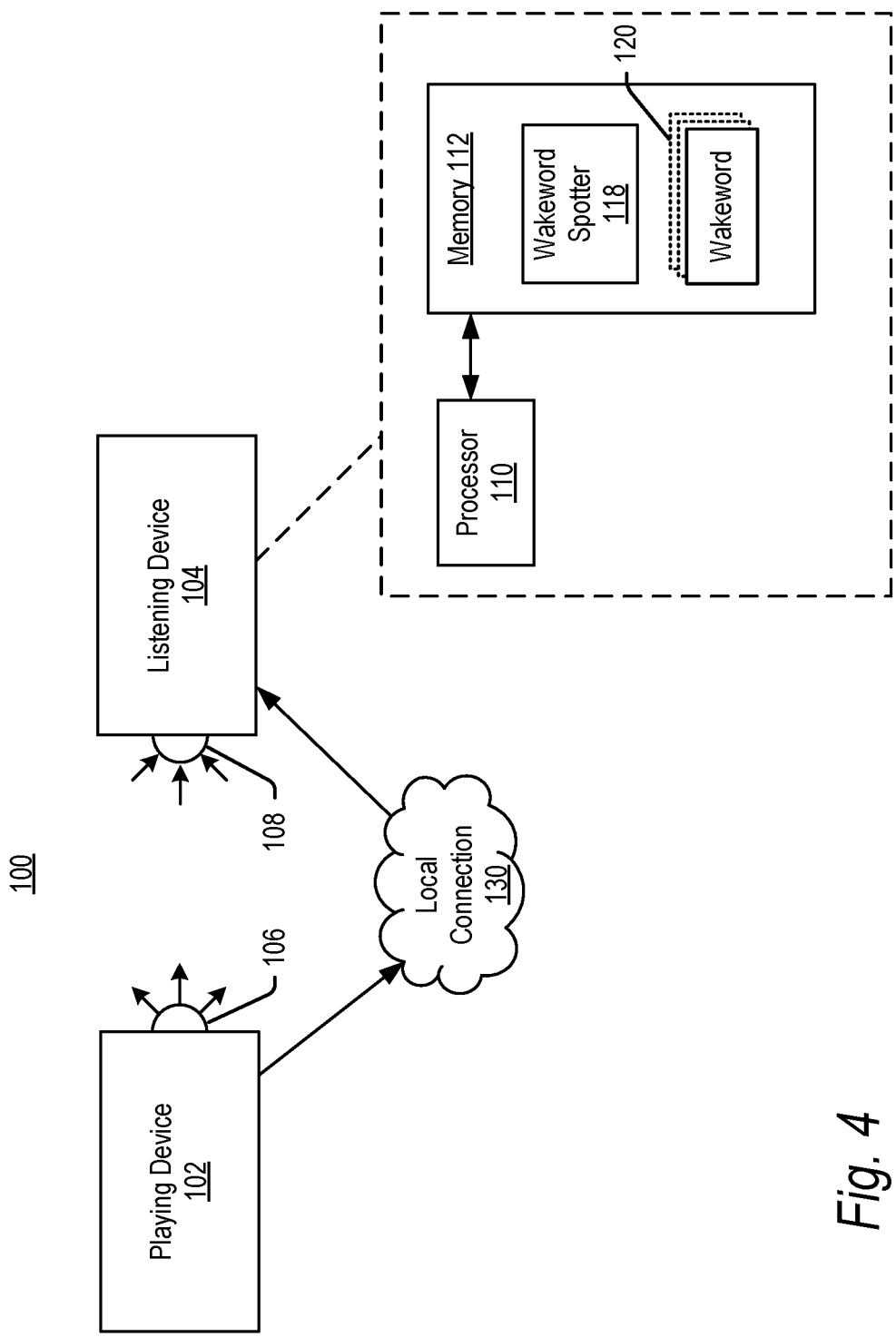
FIG. 4 is a schematic representation of a second system for wake suppression of a listening device according to embodiments of the present technology.

FIG. 4 illustrates one such embodiment of the system 100 where the playing device 102 and the listening device 104 are connected to each other by a local connection 130. In embodiments, the connection 130 is not a wide area network connection to the Internet (such embodiments are explained hereinafter). Instead, the local connection 130 may be a wired or wireless network connection allowing the playing device 102 to stream or otherwise transmit audio data to the listening device 104 independent of the speaker 106 and microphone 108. As noted, in further embodiments, the playing device 102 and listening device 104 may be incorporated into a single device, in which case local connection 130 may simply be electrical connections such as electrical traces within the single device.

As used herein, an audio stream or the streaming of audio refers to audio content or signals transmitted from the playing device to the listening device via the local connection 130 (or via the wide area connection 154 described hereinafter). As used herein, broadcast audio or audio that is broadcasted refers to audio content or signals transmitted from the speaker 106 of playing device 102 and received by the microphone 108 of the listening device 104. Broadcast audio may be reproduced audio, when it comes from a playing device 102.

In the embodiment of FIG. 4, the playing device 102 and the listening device 104 may be any of the playing devices and listening devices described above respect to FIG. 1 (each further including a network interface for connecting to each other via the local connection 130). The listening device 104 may include a processor 110, and a memory 112 including a wakeword spotter 118 and stored wakewords 120 as described above. The voice verification module 114 may be omitted in the system 100 of FIG. 4, though it may be included in further embodiments.

Figure 5:
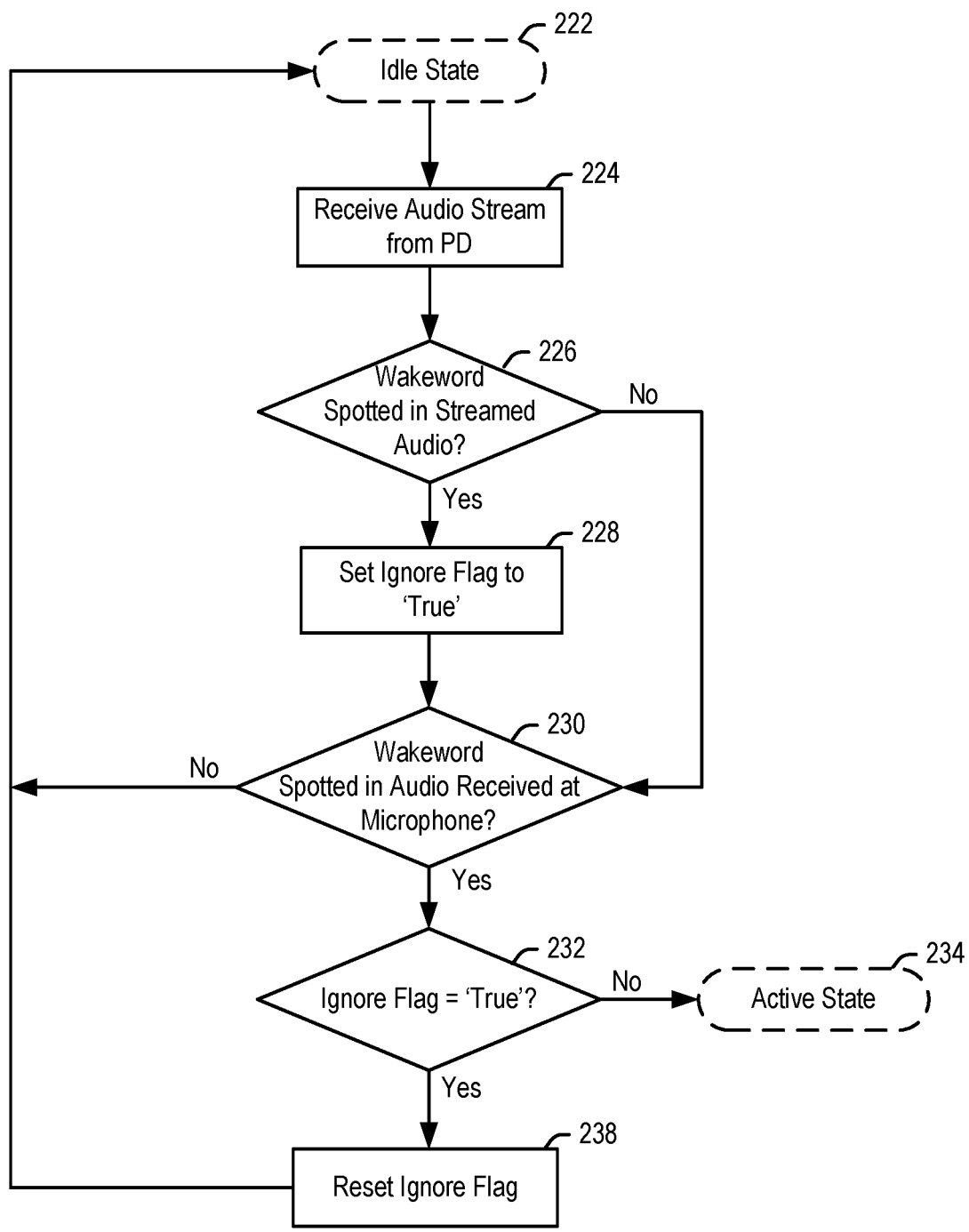
FIG. 5 is a flowchart for the operation of the second system for wake suppression of a listening device according to embodiments of the present technology.

FIG. 5 is a flowchart illustrating a possible operational implementation of the system shown in FIG. 4. The listening device 104 exists in an idle state in step 222. In step 224, audio content to be broadcast by playing device 102 is streamed from the playing device 102 to the listening device 104 via the local connection 130. In embodiments, the audio content may be streamed via the local connection 130 prior to the time that the audio content is broadcast through speaker 106 of playing device 102.

In step 226, the processor 110 of listening device 104 uses the wakeword spotter 118 to determine if the audio content streamed over the local connection 130 includes a wakeword for the listening device 104. If so, that wakeword is to be suppressed, or ignored, when the listening device spots that wakeword in the broadcast audio received at microphone 108. There are a number of methods by which the listening device can ignore a wakeword received at microphone 108 once the wakeword is detected in the audio stream. In one embodiment, a flag may be set in memory to ignore the next wakeword detected at microphone 108. Thus, if a wakeword is spotted in the audio stream in step 226, a flag, referred to herein as an ignore flag, may be set to "true" in step 228. If no wakeword is detected in the audio stream received at the listening device in step 224, step 228 of setting the ignore flag may be skipped (it remains set to "false"). Not shown in FIG. 5, once the ignore flag is set to "true", after a period of time greater than the amount of time for a sound signal to propagate across an audible range, the ignore flag is automatically reset to "false".

The listening device 104 is constantly listening for a wakeword received via microphone 108. In step 230, the processor 110 of listening device 104 analyzes audio received at microphone 108 for a wakeword. If none is detected, the listening device 104 remains in the idle state (step 222).

On the other hand, if a wakeword 120 stored in memory 112 is spotted in audio received at microphone 108 in step 230, the processor next checks whether the ignore flag is true or false in step 232. If not true (no wakeword detected in the analyzed audio stream), the listening device 104 changes to an active state in step 234. If the ignore flag is set to true (a wakeword was detected in the analyzed audio stream), the listening device 104 ignores the wakeword and remains in idle state (step 222). Before looping back to step 222, the reset flag may be reset to false in step 238.

In the embodiment described with respect to FIG. 5, the listening device ignores the next wakeword received at microphone 108 after a wakeword is spotted in the audio streamed to the listening device 104 via local network 130. This is reasonable as the streaming of the audio content to the listening device 104, and the receipt of that audio content broadcast to the microphone 108 of the listening device 104, will be generally at approximately the same time (e.g., within a few seconds of each other). However, it is conceivable that a live audio wakeword is spoken by a user to intentionally wake the listening device 104 at around the same time a wakeword to be ignored is broadcast by the playing device 102. As such, in further embodiments, the listening device 104 may employ a more robust technique for ensuring that the wakeword to be ignored is in fact the same wakeword broadcast from playing device 102.

For example, in embodiments, when a wakeword is detected in audio streamed to the listening device 104 via the local connection 130, an audio segment including the streamed wakeword may be stored in memory 112 of the listening device. The audio segment may include audio from the audio stream before and/or after the spotted wakeword. Then, when a wakeword is spotted in audio received at microphone 108, audio before and/or after the spotted wakeword may be compared against the stored audio segment. If they match, it can be inferred that the wakeword received at the microphone is in fact the same wakeword detected in the audio stream, and it can be ignored. On the other hand, if the audio segment received at the microphone 108 does not match the stored audio segment, the processor may determine that the received wakeword did not come from the playing device 102, but is instead a request from a user to activate the listening device 104, at which time the listening device can switch to an active state. Other robust techniques may be used to ensure that the wakeword to be ignored is in fact the same wakeword broadcast from playing device 102.

There are various techniques by which the listening device 104 may ignore a wakeword once it has been determined it came from the playing device 102. In one example, the wakeword spotter (or other algorithm) may be programmed with an exception in the event the ignore flag is set to true. In further embodiments, if the ignore flag is set to true, the wakeword may be subtracted from the audio received at microphone 108 when processed at the listening device. Such subtraction techniques are known, for example in the field of acoustic echo cancellation. Other techniques are possible.

In embodiments described above, the listening device 104 performs the analysis of whether a received wakeword came from a playing device 102. In further embodiments, this analysis may alternatively or additionally be performed at the playing device 102. A system 100 according such an embodiment will now be described with reference to FIG. 6.

Figure 6:
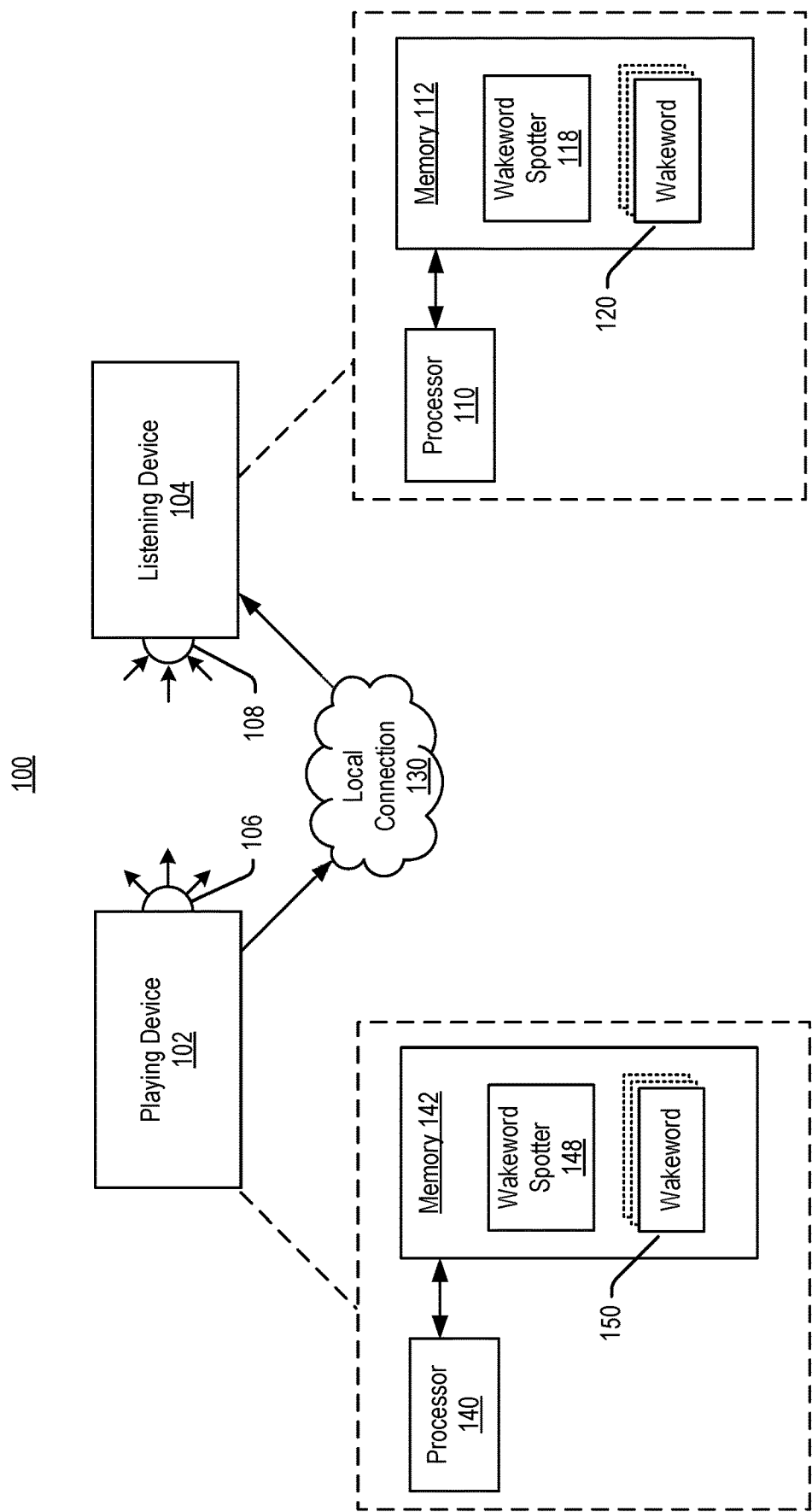
FIG. 6 is a schematic representation of a third system for wake suppression of a listening device according to embodiments of the present technology.

In the embodiment of FIG. 6, the playing device 102 and the listening device 104 may be any of the playing devices and listening devices described above respect to FIG. 1 or 4, networked to each other via a local connection 130. In this embodiment, the playing device 102 may also include a processor and memory, 140, 142, where the memory 142 includes a wakeword spotter 148 and stored wakewords 150 as described above.

Figure 7:
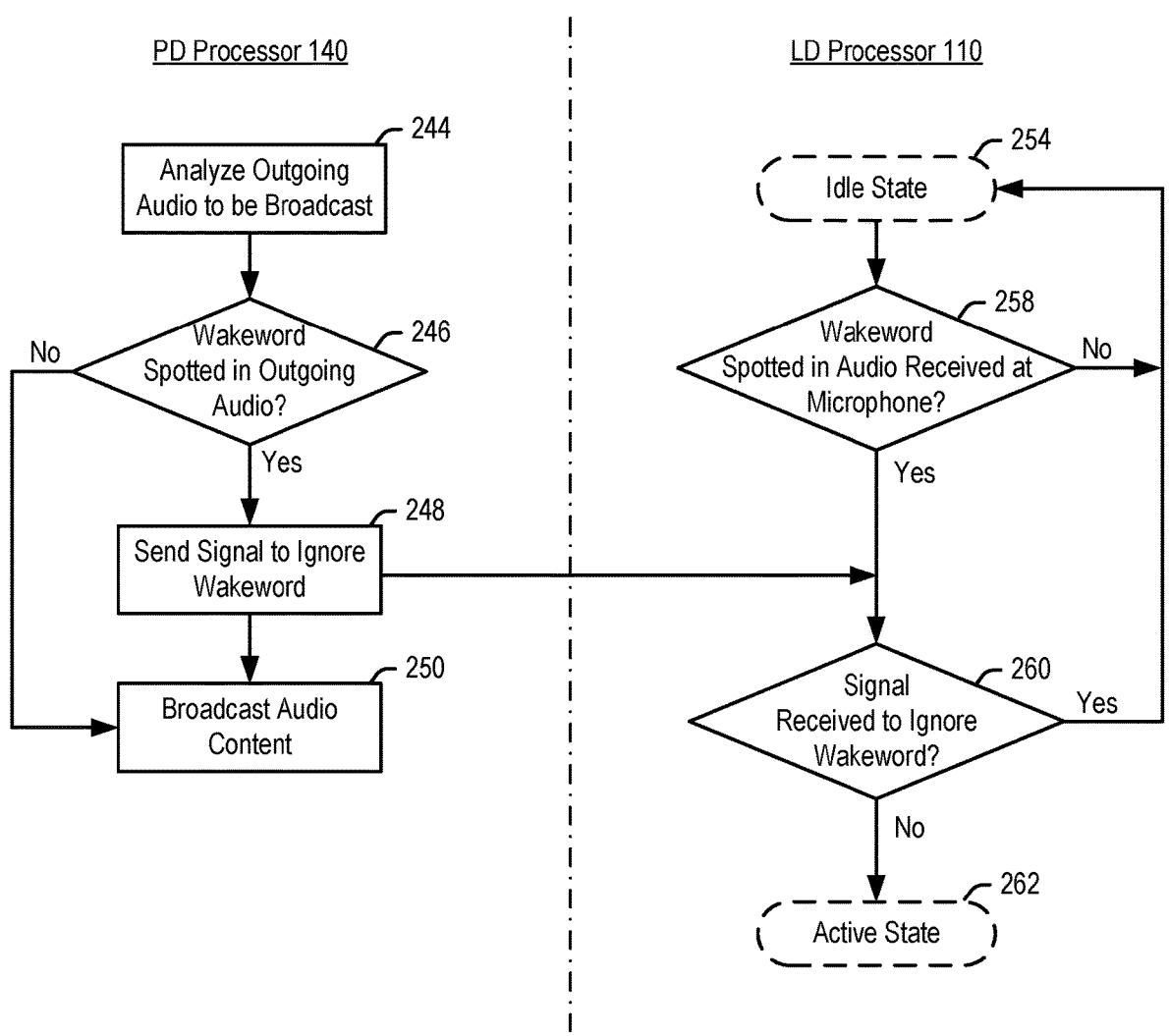
FIG. 7 is a flowchart for the operation of the third system for wake suppression of a listening device according to embodiments of the present technology.
Figure 8:
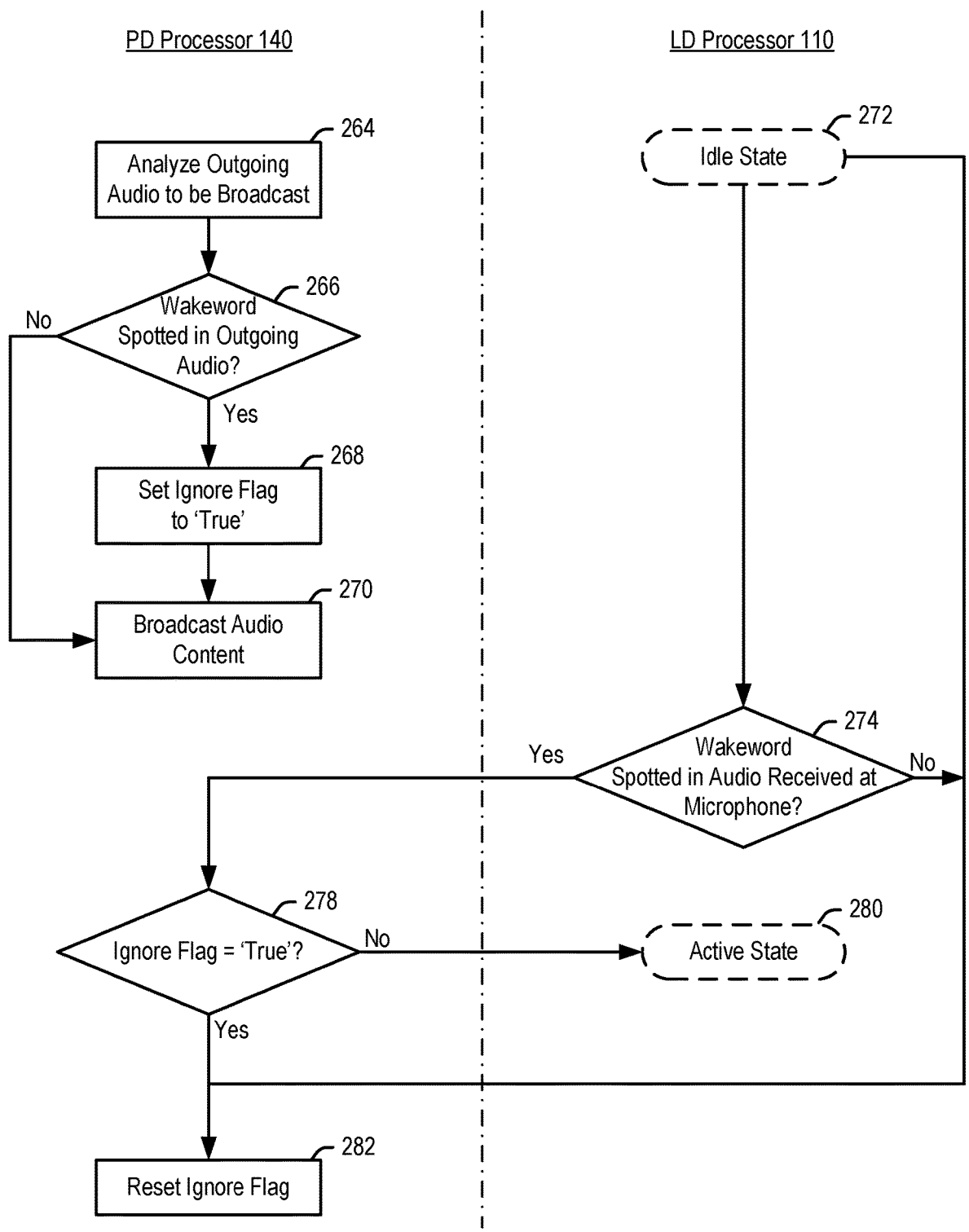
FIG. 8 is a flowchart for the operation of the third system for wake suppression of a listening device according to further embodiments of the present technology.

FIGS. 7 and 8 are flowcharts illustrating possible operational implementations of the system shown in FIG. 6. Referring initially to FIG. 7, in step 244, the processor 140 of the playing device 102 analyzes the audio content that the playing device 102 is going broadcast, using the wakeword spotter 148 to spot wakewords for the listening device 104. If no wakeword is detected in the analyzed audio content in step 246, the audio content is broadcast in step 250.

If, on the other hand, a wakeword is detected in the analyzed audio content, the processor 140 of the playing device 102 generates an ignore signal which is transmitted in step 248 to the listening device 104. In embodiments, the ignore signal is transmitted via the local connection 130. However, it is conceivable that the ignore signal may be acoustically embedded within the audio that is broadcast via speaker 106 from playing device 102. The playing device 102 may broadcast the analyzed audio content in step 250 after the ignore signal is sent in step 248.

Meanwhile, the listening device 104 may exist in an idle state in step 254. In step 258, the processor 110 of listening device 104 analyzes audio received at microphone 108 for a wakeword. If none is detected, the listening device 104 remains in the idle state (step 254). If, on the other hand, the listening device 104 detects a wakeword in step 258, the processor 110 of the listening device checks in step 260 whether an ignore signal has been received and stored. If so, the detected wakeword is taken as coming from the playing device 102 and is ignored so that the listening device remains in an idle state (step 254). If there is no ignore signal in step 260 when the wakeword is spotted, this is interpreted as a valid user query to wake the listening device 104, and the listening device may switch to an active state in step 262. Not shown in FIG. 7, once processor 110 of the listening device receives and stores the ignore signal, after a period of time greater than the amount of time for a sound signal to propagate across an audible range, the processor 110 discards the stored ignore signal.

The embodiment of FIG. 7 may employ more robust techniques for determining whether to ignore a wakeword spotted in the audio received at microphone 108. For example, in addition to sending the ignore signal, the playing device 102 may send an audio segment including the wakeword. Audio received at the microphone 108 including a wakeword may be compared against the received audio segment as described above. Other more robust techniques are possible.

The embodiment of FIG. 7 has an advantage that the full audio content to be broadcast by the playing device 102 does not need to be continuously streamed from the playing device 102 to listening device 104 by the local connection 130. Only the ignore signal (and possibly a segment of audio data around the identified wakeword) gets streamed. The embodiment of FIG. 7 may also be characterized as a "push" implementation, in that a wakeword in the streamed data is identified at the playing device and then the signal to ignore that wakeword is pushed to listening device. FIG. 8, which will now be described, illustrates an alternative "pull" implementation of the system shown in FIG. 6.

In FIG. 8, in step 264, the processor 140 of the playing device 102 analyzes the audio content that the playing device 102 is going broadcast, using the wakeword spotter 148 to spot wakewords for the listening device 104. If no wakeword is detected in the analyzed audio content in step 266, the audio content is broadcast in step 270.

If, on the other hand, a wakeword is detected in the analyzed audio content, the processor 140 of the playing device 102 may set the ignore flag to "True" in step 268 as described above. After the ignore flag is set in step 268, the playing device 102 may broadcast the analyzed audio content in step 270.

Meanwhile, the listening device 104 may exist in an idle state in step 272. In step 274, the processor 110 of listening device 104 analyzes audio received at microphone 108 for a wakeword. If none is detected, the listening device 104 remains in the idle state (step 272). On the other hand, if a wakeword is detected at the microphone 108, the listening device 104 may query the playing device 102 in step 274 as to whether the ignore flag is true.

The processor 140 of the playing device 102 checks the status of the ignore flag in step 278. If the ignore flag is not true, the playing device 102 did not detect a wakeword in the outgoing broadcast, and it pings the listening device 104 back that it should wake the device 104 (step 280). If the ignore flag is true in step 278, the playing device 102 did detect a wakeword in the outgoing broadcast, and it pings the listening device 104 back to ignore the wakeword and remain in the idle state (step 272). The ignore flag may also be reset to false in step 282. More robust techniques may be used to determine whether to ignore a wakeword spotted in the audio received at microphone 108 as described above. Not shown in FIG. 8, once the ignore flag is set to "true", after a period of time greater than the amount of time for a sound signal to propagate across an audible range and a listening device to check the status, the ignore flag is automatically reset to "false".

In the embodiments of FIGS. 6-8, the playing device 102 needs to have in storage the one or more wakewords to which listening device 104 responds. This may be accomplished in a variety of ways. In embodiments, the playing device 102 and listening device 104 may be part of the same "walled garden," i.e., the devices 102, 104 are from the same manufacturer, or provided by the same service provider, such that the playing device 102 may have the same stored list of one or more wakewords 120 as the listening device 104. Where the devices 102 and 104 are not part of the same walled garden, the playing device 102 may alternatively obtain the list of one or more wakewords 120 stored on the playing device 102. For example, the list of stored wakewords may periodically be synced from the listening device 104 to the playing device 102 or synced as a firmware update for playing device 102.

In embodiments described above, the present technology is able to suppress waking of a listening device for wakewords broadcast by playing device without a wide area (Internet) network connection. Such systems are useful for example where Internet access is unavailable. However, in further embodiments of the present technology, the playing and/or listening devices 102, 104 may have an Internet connection to a remote server associated with listening device 104, for example configured to perform more computationally intensive determinations of wakeword utterances. Such an embodiment will now be described with reference to FIG. 9.

Figure 9:
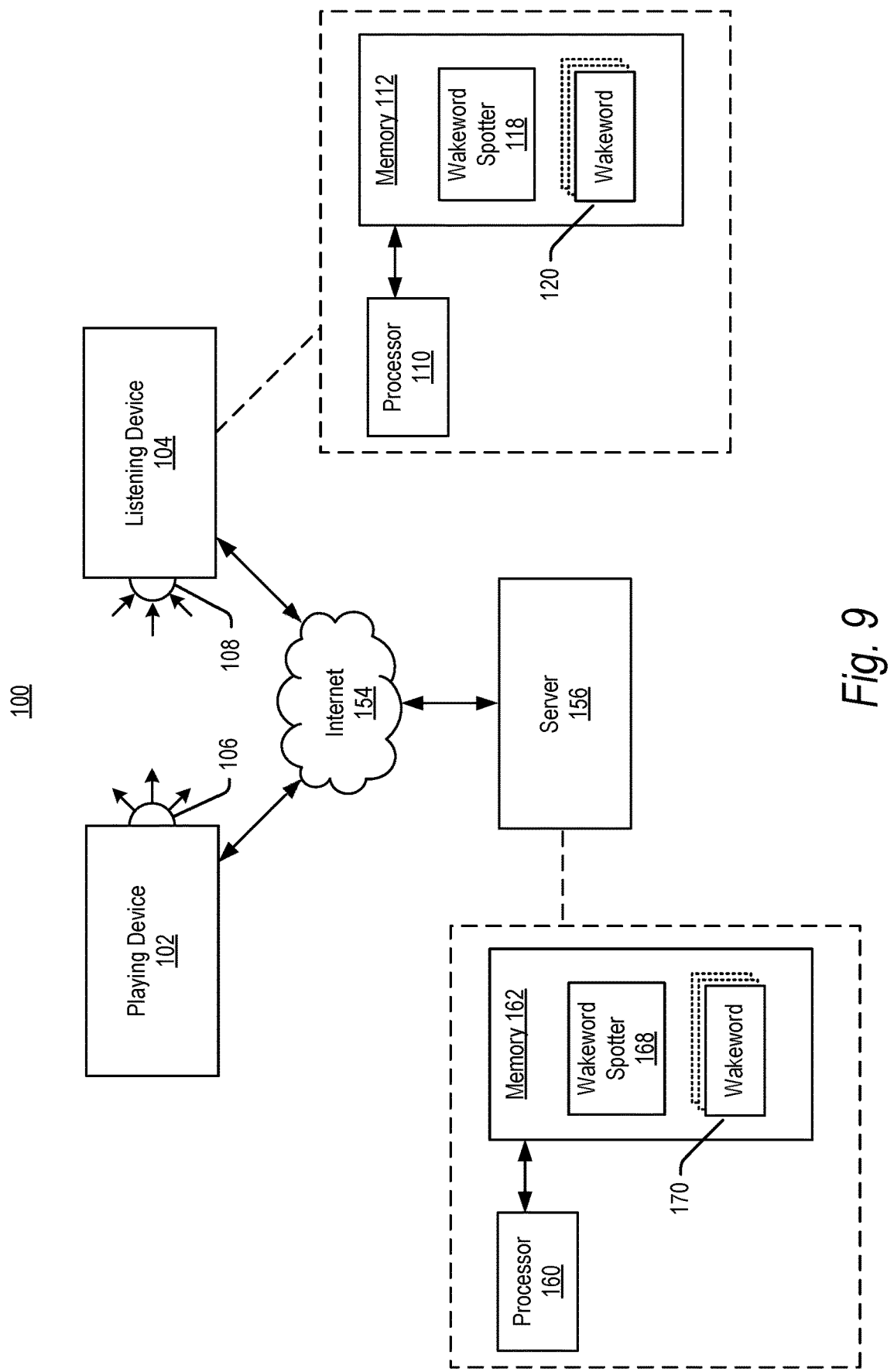
FIG. 9 is a schematic representation of a fourth system for wake suppression of a listening device according to embodiments of the present technology.

In the embodiment of FIG. 9, the playing device 102 and the listening device 104 may be any of the playing devices and listening devices described above respect to FIG. 1, 4 or 6 (playing device 102 may or may not include processor 140 and memory 142 described above). In this embodiment, the playing and listening devices 102, 104 may have a wide area network connection 154 to the Internet. In accordance with this embodiment, the playing and listening devices 102, 104 may connect with a server 156 via the Internet 154 (or other type of network). An example implementation of server 156 is described below with respect to FIG. 14, but in general, server 156 may include a processor 160 and a memory 162 as described above. Memory 162 may include a wakeword spotter 168 and stored wakewords 170 as described above. The wakewords 170 may be synced to, or otherwise match, the wakewords 120 stored in the listening device 104. In embodiments, the wakeword spotter of the server 156 may achieve significantly greater accuracy, speed, or parallelism across multiple wakewords than may be achieved with the processor 140 in playing device 102 or the processor 110 in listening device 104. In embodiments, the server may implement a voice verification module 114 as described above. Such a module may have software components executing on the playing device 104 for discerning live audio from reproduced audio as described above.

Figure 10:
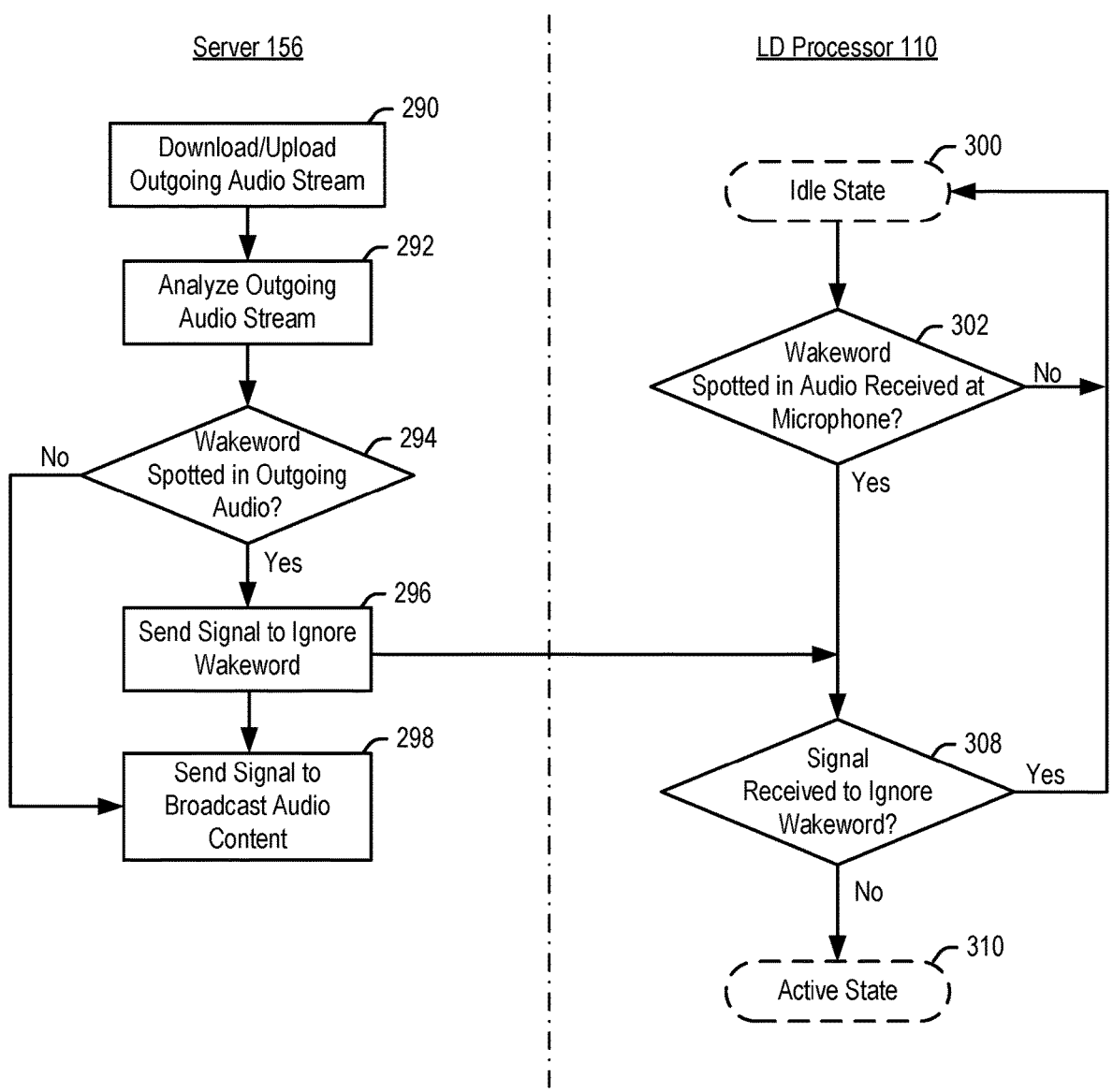
FIG. 10 is a flowchart for the operation of the fourth system for wake suppression of a listening device according to embodiments of the present technology.
Figure 11:
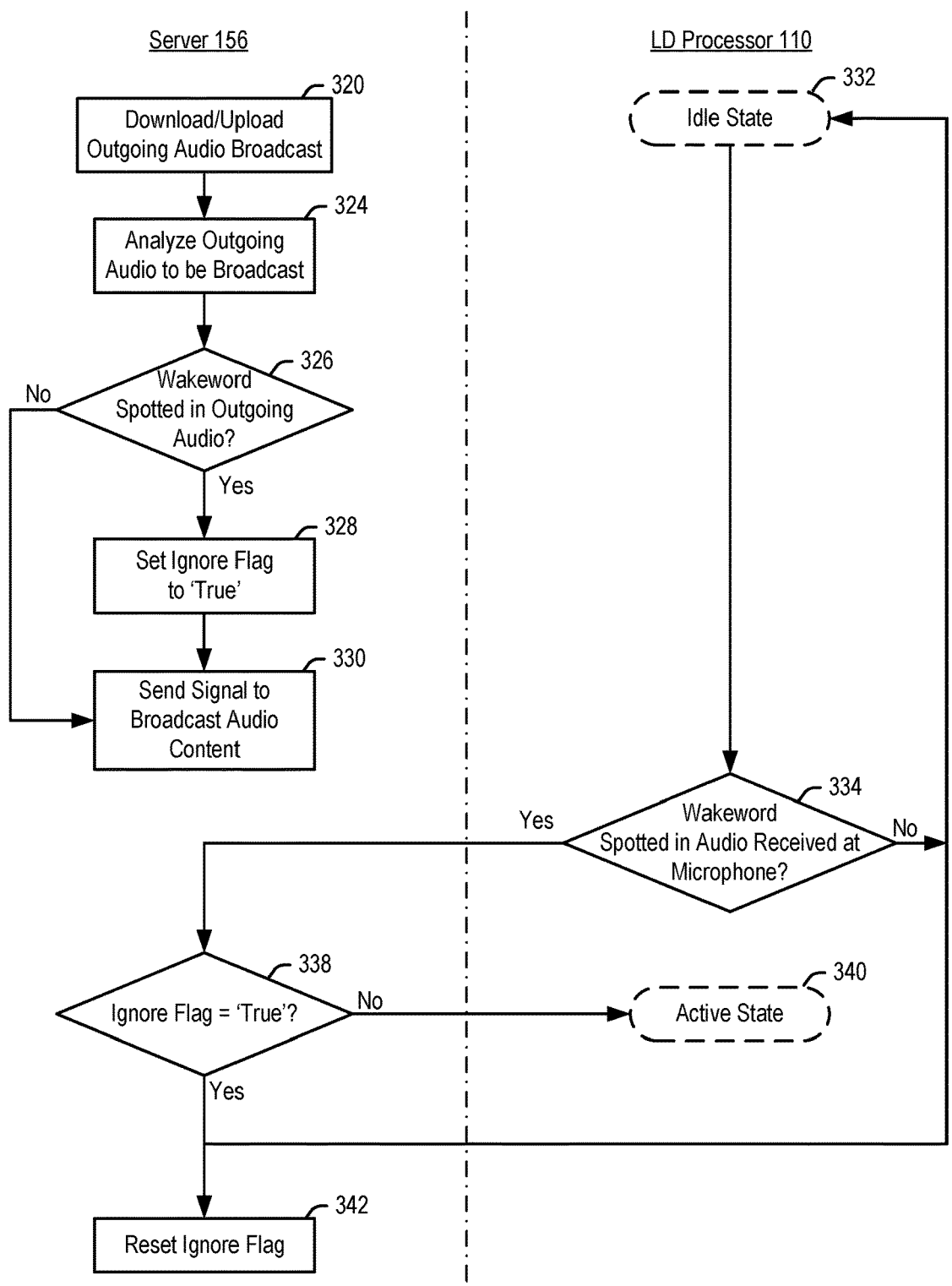
FIG. 11 is a flowchart for the operation of the fourth system for wake suppression of a listening device according to further embodiments of the present technology.

FIGS. 10 and 11 are flowcharts illustrating possible operational implementations of the system shown in FIG. 9. In this embodiment, the server 156 has, or is provided with, the audio content that is going to be output from the playing device 102. Referring to FIG. 10, this may happen a variety of ways in step 290. In one example, the audio content to be broadcast by playing device 102 may come from server 156 itself. In that instance, the audio content may be downloaded from the server 156 to the playing device 102 via the Internet 154 in step 290. In another example, the audio content to be broadcast by playing device 102 may come from playing device 102, or some other source other than the server 156. In such embodiments, the server 156 may upload the audio content via the Internet 154 in step 290, either from the playing device 102 or from another source of the audio content to be broadcast by playing device 102.

In step 292, the processor 160 of the server 156 analyzes the audio content that the playing device 102 is going broadcast, using the wakeword spotter 168 to spot wakewords for the listening device 104. If no wakeword is detected in the analyzed audio content in step 294, the server 156 sends a signal to the playing device 102 to broadcast the audio content in step 298.

If, on the other hand, a wakeword is detected in the analyzed audio content, the processor 160 of the server 156 generates an ignore signal which is transmitted via the Internet 154 to the listening device 104 in step 296. After the ignore signal is sent, the server 156 may send a signal to the playing device 102 to broadcast the audio content in step 298.

Meanwhile, the listening device 104 may exist in an idle state in step 300. In step 302, the processor 110 of listening device 104 analyzes audio received at microphone 108 for a wakeword. If none is detected, the listening device 104 remains in the idle state (step 300). If, on the other hand, the listening device 104 detects a wakeword in step 302, the processor 110 of the listening device checks in step 308 whether an ignore signal has been received from the server 156. If so, the detected wakeword is taken as coming from the playing device 102 and is ignored so that the listening device remains in an idle state (step 300). If there is no ignore signal in step 308 when the wakeword is spotted, this is interpreted as a valid user query to wake the listening device 104, and the listening device may switch to an active state in step 310. The embodiment of FIG. 10 may employ more robust techniques for determining whether to ignore a wakeword spotted in the audio received at microphone 108 in further embodiments as described above. Not shown in FIG. 10, once processor 110 of the listening device receives the ignore signal, after a period of time greater than the amount of time for a sound signal to propagate across an audible range, the processor 110 discards the ignore signal.

The embodiment of FIG. 10 has an advantage in that the full audio does not need to be continuously streamed from the playing device 102 or server 156 to listening device 104. The embodiment of FIG. 10 may also be characterized as a push implementation, in that a wakeword in the streamed data is identified at the playing device and then pushed to listening device. FIG. 11, which will now be described, illustrates an alternative "pull" implementation of the system 100 shown in FIG. 9.

In FIG. 11, in step 320, the server downloads audio content to the playing device 102, or uploads content from the playing device 102 or other source. In step 324, the processor 160 of the server 156 analyzes the audio content that the playing device 102 is going broadcast, using the wakeword spotter 168 to spot wakewords for the listening device 104. If no wakeword is detected in the analyzed audio content in step 326, the server 156 sends a signal to the playing device 102 to broadcast the audio in step 270.

If, on the other hand, a wakeword is detected in the analyzed audio content, the processor 160 of the server 156 may set an ignore flag to "True" in step 328 as described above. After the ignore flag is set in step 328, the server 156 may send a signal to the playing device 102 to broadcast the analyzed audio content in step 330.

Meanwhile, the listening device 104 may exist in an idle state in step 332. In step 334, the processor 110 of listening device 104 analyzes audio received at microphone 108 for a wakeword. If none is detected, the listening device 104 remains in the idle state (step 332). On the other hand, if a wakeword is detected at the microphone 108, the listening device 104 may query the server 156 in step 334 as to whether the ignore flag is true.

The processor 160 of the server 156 checks the status of the ignore flag in step 338. If the ignore flag is not true, the server 156 did not detect a wakeword in the broadcast from the playing device 102, and the server 156 signals the listening device 104 that it should wake the device 104 (step 340). If the ignore flag is true in step 338, the server 156 did detect a wakeword in the broadcast from playing device 102, and the server 156 signals the listening device 104 to ignore the wakeword and remain in the idle state (step 332). The ignore flag may also be reset to false in step 342. More robust techniques may be used to determine whether to ignore a wakeword spotted in the audio received at microphone 108 as described above.

The embodiments described above describe various embodiments of a system configured to ignore a wakeword in a speech-enabled listening device when it is determined the wakeword is reproduced audio. As used in any of the embodiments described herein, reproduced audio is audio that is broadcast from a playing device 102, as opposed to live audio, which is spoken by a user near the listening device.

In embodiments described above, the present technology is able to suppress waking of a listening device for wakewords broadcast by playing device with a real-time detection of broadcast audio having a wakeword. Such systems are useful for example where media is raw and not previously formatted. However, in further embodiments of the present technology, the media that is broadcast by the playing devices 102 is previously formatted such as in a non-real-time, at a prior time, or super-real-time using a high performance server. Such an embodiment will now be described with reference to FIG. 12.

Figure 12:
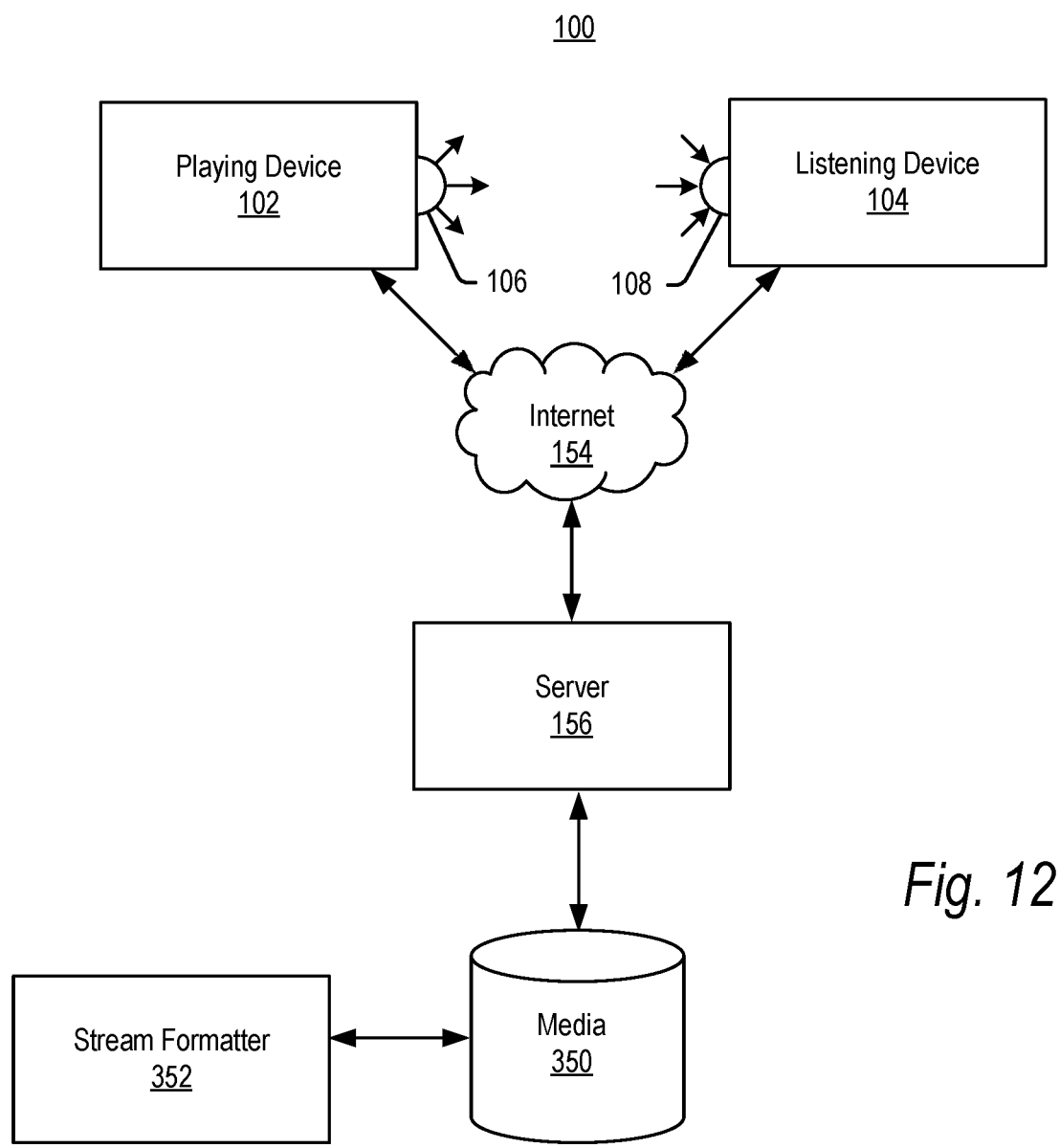
FIG. 12 is a schematic representation of a fifth system for wake suppression of a listening device according to embodiments of the present technology.

In the embodiment of FIG. 12, the playing device 102 and the listening device 104 may be any of the playing devices and listening devices described above respect to FIG. 1, 4, 6, or 9 (playing device 102 may or may not include processor 140 and memory 142 described above listening device 104 may or may not include processor 110 and memory 112 described above). In this embodiment, the playing and listening devices 102, 104 may have a wide area network connection 154 to the Internet. In accordance with this embodiment, the playing and listening devices 102, 104 may connect with a server 156 via the Internet 154 (or other type of network). An example implementation of server 156 is described below with respect to FIG. 14, but in general, server 156 may include a processor 160 and a memory 162 as described above. Memory 162 may include a wakeword spotter 168 and stored wakewords 170 as described above. The wakewords 170 may be synced to, or otherwise match, the wakewords 120 stored in the listening device 104.

Server 156 accesses media stored in a database 350, which includes multiple synchronized elementary streams. Some such formats are defined by existing multimedia standards such as Advanced Television Systems Committee (ATSC), Digital Video Broadcasting (DVB), Motion Picture Expert Group (MPEG) Transport Stream, Windows Media, VP9, AOMedia Video 1 (AV1), WebM, HTML 5 video, HTML 5 audio, and other multimedia formats. At least one elementary stream contains audio and at least some of the audio contains the wakeword. Other streams may contain video, captioning, and other types of supplementary information. Some such commercial databases are held by companies and services such as YouTube®, Netflix®, Apple TV®, Disney®, HBO®, and Audible®. At least one elementary stream contained in the media includes synchronized signals that indicate at approximately when or shortly before or shortly after the audio elementary stream includes the sound of the wakeword being spoken. The elementary stream that contains the wakeword signal in the media stored in database 350 is generated by a stream formatter 352 that processes the media from database 350. The stream formatter may comprise a wakeword spotter. In further embodiments, the wakeword spotter of the stream formatter 352 may run on a high-performance cloud server (such as server 156) and thereby achieve significantly greater accuracy, speed, or parallelism across multiple wakewords than may be achieved with the processor 140 in playing device 102 or the processor 110 in listening device 104.

In a system, such as YouTube®, that processes user-created video content, the stream formatter 352 may run on video when it is uploaded by users to create and store the elementary stream with the wakeword signals with the media in database 350. In a system with professionally produced media content, such as audio books, movies, television series, or commercials, stream formatting may be done in a studio either automatically or manually to create the elementary stream with the wakeword signals.

Figure 13:
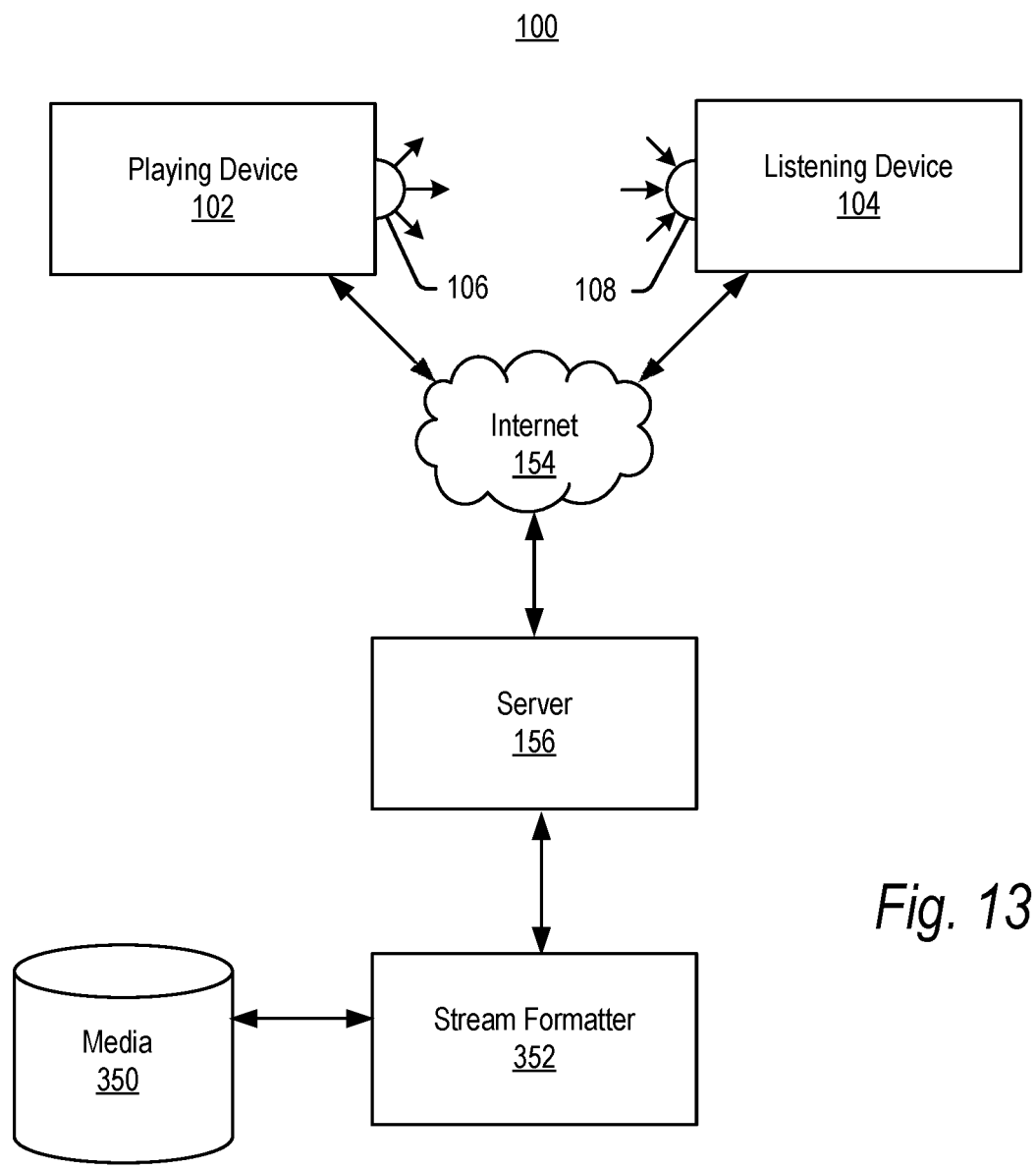
FIG. 13 is a schematic representation of a sixth system for wake suppression of a listening device according to embodiments of the present technology.

FIG. 13 shows a further embodiment in which media 350 passes through stream formatter 352 as it is provided to server 156. This is appropriate for live-performance media content that has an elementary stream with a wakeword signal generated in real-time. However, unlike the wakeword spotter 148 run on the processor 140 of playing device 102, the stream formatter 352 runs on high performance media production equipment. Such equipment may be located in a media van for news capture, the on-site equipment of studios, stadiums, and performance venues, or in remote servers.

In embodiments that use an elementary media stream with wakeword signals, such as the ones of FIG. 12 and FIG. 13, the elementary stream is encoded in the media provided through the network 154 to playing device 102. Playing device 102 decodes the media and extracts the elementary stream with the wakeword signal. When playing media with which a wakeword signal is encoded, the playing device 102 may perform functions as described with relation to previously described embodiments. For example, playing device 102 may embed an inaudible acoustic signal with the audio that it outputs containing the wakeword, and playing device 102 may send an electronic signal to listening device 104 to ignore the wakeword. In embodiments in which a single device comprises both the functions of a playing device 102 and listening device 104, when a media stream is decoded with an elementary stream that signals a wakeword, the device may automatically disregard a detection by wakeword spotter 118.

Figure 14:
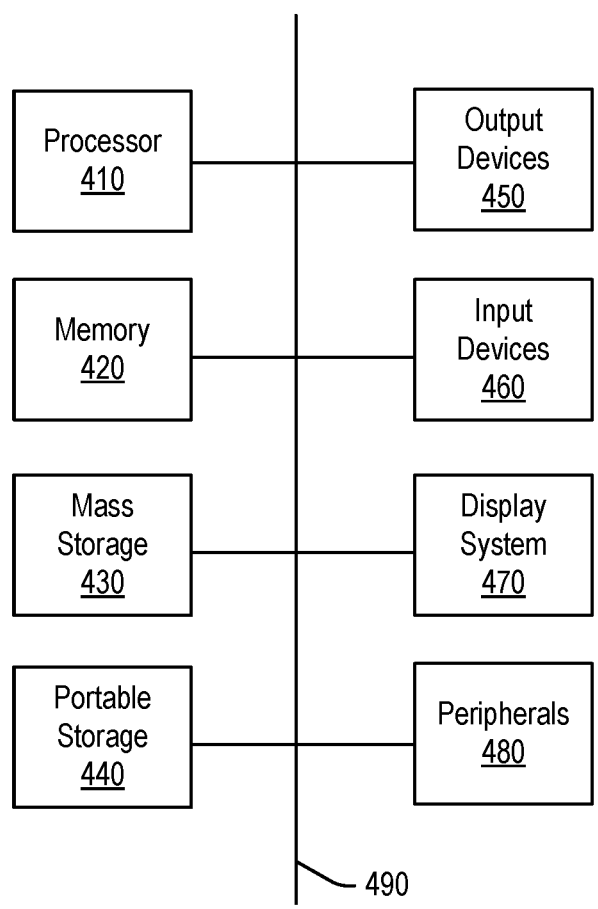
FIG. 14 is a schematic block diagram of a computing environment according to embodiments of the present technology.

FIG. 14 illustrates an exemplary computing system 400 that may be the playing device 102, the listing device 103 or the server 156 used to implement embodiments of the present technology. The computing system 400 of FIG. 14 includes one or more processors 410 and main memory 420. Main memory 420 stores, in part, instructions and data for execution by processor unit 410. Main memory 420 can store the executable code when the computing system 400 is in operation. The computing system 400 of FIG. 14 may further include a mass storage device 430, portable storage medium drive(s) 440, output devices 450, user input devices 460, a display system 470, and other peripheral devices 480.

The components shown in FIG. 14 are depicted as being connected via a single bus 490. The components may be connected through one or more data transport means. Processor unit 410 and main memory 420 may be connected via a local microprocessor bus, and the mass storage device 430, peripheral device(s) 480, portable storage medium drive(s) 440, and display system 470 may be connected via one or more input/output (I/O) buses.

Mass storage device 430, which may be implemented with a magnetic disk drive an optical disk drive, non-volatile semiconductor memory, or other technologies, is a non-volatile storage device for storing data and instructions for use by processor unit 410. Mass storage device 430 can store the system software for implementing embodiments of the present invention for purposes of loading that software into main memory 420.

Portable storage medium drive(s) 440 operate in conjunction with a portable non-volatile storage medium, such as a floppy disk, compact disk or digital video disc, to input and output data and code to and from the computing system 400 of FIG. 14. The system software for implementing embodiments of the present invention may be stored on such a portable medium and input to the computing system 400 via the portable storage medium drive(s) 440.

Input devices 460 may provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 14 includes output devices 450. Suitable output devices include speakers, printers, network interfaces, and monitors. Where computing system 400 is part of a mechanical client device, the output device 450 may further include servo controls for motors within the mechanical device.

Display system 470 may include a liquid crystal display (LCD) or other suitable display device. Display system 470 receives textual and graphical information and processes the information for output to the display device.

Peripheral device(s) 480 may include any type of computer support device to add additional functionality to the computing system. Peripheral device(s) 480 may include a modem or a router.

The components contained in the computing system 400 of FIG. 14 are those typically found in computing systems that may be suitable for use with embodiments of the present invention and are intended to represent a broad category of such computer components that are well known in the art. Thus, the computing system 400 of FIG. 14 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX, Linux, Windows, Macintosh OS, Android, and other suitable operating systems.

Some of the above-described functions may be composed of instructions that are stored on storage media (e.g., computer-readable medium). The instructions may be retrieved and executed by the processor. Some examples of storage media are memory devices, tapes, punched cards, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media and volatile media. Non-volatile media include, for example, optical or magnetic disks, such as a fixed disk. Volatile media include dynamic memory, such as system RAM. Common forms of computer-readable media include, for example, a floppy disk, a flexible disk, a hard disk, magnetic tape, any other magnetic medium, a CD- ROM disk, digital video disk (DVD), any other optical medium, any other physical medium with patterns of marks or holes, a RAM, a PROM, an EPROM, an EEPROM, a FLASHEPROM, any other memory chip or cartridge, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

In summary, the present technology relates to a speech-enabled device configured to listen for a wakeword, comprising: a microphone configured to receive audio; and a processor configured to execute software code to: receive a first audio signal from the microphone including the wakeword, switch the speech-enabled device from an idle state to an active state in response to detecting the wakeword in the first audio signal, receive a second audio signal from the microphone including the wakeword, determine that the second audio signal is reproduced audio, and leave the speech-enabled device in the idle state in response to detecting the second wakeword in the second audio signal and determining that the second audio signal is reproduced audio.

In another example, the present technology relates to a first device having a connection to a second, speech-enabled device, the speech-enabled device including a microphone and the speech-enabled device configured to listen for a wakeword, the first device comprising: a network interface; and a processor configured to execute software code to: analyze audio to be broadcast to a microphone of the speech-enabled device, spot, in the audio to be broadcast, a wakeword known to be used to activate the speech-enabled device, and transmit, upon spotting the wakeword, an ignore signal to the speech-enabled device configured to have the speech-enabled device ignore the wakeword upon receipt of the wakeword at the microphone of the speech-enabled device.

In a further example, the present technology relates to a speech-enabled device having a connection to an audio-playing device, the speech-enabled device configured to listen for a wakeword, the speech-enabled device comprising: a processor configured to execute software code to: receive audio, including the wakeword, from the audio-playing device, analyze the received audio to spot the wakeword, and ignore the wakeword spotted in the audio, to leave the speech-enabled device in an idle state, upon determining the audio came from the audio-playing device.

In another example, the present technology relates to a speech-enabled device having a connection to an audio-playing device, the speech-enabled device configured to listen for a wakeword, the speech-enabled device comprising: a microphone configured to receive audio; and a processor configured to execute software code to: receive a stream of audio, including the wakeword, from the audio-playing device via the connection, analyze the received audio stream to spot the wakeword, receive a broadcast of the audio at the microphone, including the wakeword, from the audio-playing device, analyze the received audio broadcast to spot the wakeword, ignore the wakeword spotted in the broadcast of the audio received at the microphone to leave the speech-enabled device in an idle state.

In a further example, the present technology relates to a speech-enabled device configured to listen for a wakeword, comprising: a microphone configured to receive audio; and means for ignoring the wakeword received at the microphone, to leave the speech-enabled device in an idle state, upon determining the audio is reproduced audio.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the invention as described herein.

We claim:

1. An audio extracting device configured to receive an audio signal transmitted to or from an audio device, the audio extracting device comprising:
    an input connector configured to receive the audio signal from an input wired connection coupled to the audio extracting device;
    an output connector configured to transmit the audio signal to an output wired connection coupled to the audio extracting device, wherein one of the input wired connection and the output wired connection transmit the audio signal to or from the audio device; and
    a radio transmitter configured to transmit the audio signal encoded in a wireless signal;
    wherein the input wired connection has a first end coupled to the audio extracting device and a second end opposite the first end coupled to the audio device.

2. The audio extracting device of claim 1, wherein the audio extracting device is configured to form a wireless connection to a speech-enabled device, wherein the wireless signal is configured to provide the audio signal to the speech-enabled device through the wireless connection.

3. The audio extracting device of claim 1, wherein the audio device is one of a television, stereo and computer.

4. A speech-enabled device comprising:
    a microphone configured to capture audio;
    a first phrase spotter instance configured to detect a wakeword in audio captured by the microphone;
    a radio receiver configured to receive a wireless signal having an encoded audio signal;
    a second phrase spotter instance configured to detect the wakeword in the encoded audio signal; and
    logic to respond to the wakeword unless the second phrase spotter detects the wakeword before the first phrase spotter detects the wakeword.

5. The speech-enabled device of claim 4 configured to form a wireless connection to an audio extracting device, wherein the encoded audio signal is received through the wireless connection.

6. A speech-enabled device comprising:
a microphone configured to capture audio;
a radio receiver configured to receive a wireless signal having an encoded audio signal;
one or more processors configured to execute software instructions to:
  detect a wakeword in the audio captured by the microphone;
  detect the wakeword in the encoded audio signal; and
  respond to the wakeword unless the one or more processors detect the wakeword captured by the microphone shortly before the one or more processors detect the wakeword encoded in the audio signal.

7. An audio extracting device configured to receive an audio signal transmitted to or from an audio device, the audio extracting device comprising:
an input connector configured to receive the audio signal from an input wired connection coupled to the audio extracting device;
an output connector configured to transmit the audio signal to an output wired connection coupled to the audio extracting device, wherein one of the input wired connection and the output wired connection transmit the audio signal to or from the audio device; and
a radio transmitter configured to transmit the audio signal encoded in a wireless signal;
wherein the output wired connection has a first end coupled to the audio extracting device and a second end opposite the first end coupled to the audio device.

8. The audio extracting device of claim 7, wherein the audio extracting device is configured to form a wireless connection to a speech-enabled device, wherein the wireless signal is configured to provide the audio signal to the speech-enabled device through the wireless connection.

9. The audio extracting device of claim 7, wherein the output wired connection has a first end coupled to the audio extracting device and a second end opposite the first end coupled to the audio device.

10. The audio extracting device of claim 7, wherein the audio device is one of a television, stereo and computer.

* * * * *